US010668378B2

(12) United States Patent
Griffais

(10) Patent No.: US 10,668,378 B2
(45) Date of Patent: Jun. 2, 2020

(54) DISTRIBUTING SHADERS BETWEEN CLIENT MACHINES FOR PRECACHING

(71) Applicant: Valve Corporation, Bellevue, WA (US)

(72) Inventor: Pierre-Loup Miguel Griffais, Mercer Island, WA (US)

(73) Assignee: Valve Corporation, Bellevue, WA (US)

(*) Notice: Subject to any disclaimer, the term of this patent is extended or adjusted under 35 U.S.C. 154(b) by 108 days.

(21) Appl. No.: 15/881,552

(22) Filed: Jan. 26, 2018

(65) Prior Publication Data

US 2019/0232164 A1 Aug. 1, 2019

(51) Int. Cl.
| A63F 9/24 | (2006.01) |
| A63F 13/52 | (2014.01) |
| G06F 8/41 | (2018.01) |
| G06T 1/60 | (2006.01) |
| A63F 13/79 | (2014.01) |
| G06T 15/80 | (2011.01) |
| A63F 13/95 | (2014.01) |
| G06T 1/20 | (2006.01) |
| G06F 9/455 | (2018.01) |

(52) U.S. Cl.
CPC .............. *A63F 13/52* (2014.09); *A63F 13/79* (2014.09); *A63F 13/95* (2014.09); *G06F 8/41* (2013.01); *G06F 9/455* (2013.01); *G06F 9/4552* (2013.01); *G06T 1/20* (2013.01); *G06T 1/60* (2013.01); *G06T 15/80* (2013.01)

(58) Field of Classification Search
CPC ... G06T 1/20; G06T 1/60; G06T 15/80; G06F 8/41; A63F 13/52; A63F 13/79; A63F 13/95
See application file for complete search history.

(56) References Cited

U.S. PATENT DOCUMENTS

| 2009/0113402 A1* | 4/2009 | Chen | G06F 8/41 717/140 |
| 2014/0043333 A1* | 2/2014 | Narayanan | G06F 1/324 345/426 |
| 2014/0047470 A1* | 2/2014 | Janus | H04N 21/2541 725/30 |

(Continued)

OTHER PUBLICATIONS

PCT Search Report and Written Opinion dated Apr. 23, 2019 for PCT Application No. PCT/US19/15205, 13 pages.

*Primary Examiner* — Steve Rowland
(74) *Attorney, Agent, or Firm* — Lee & Hayes, P.C.

(57) ABSTRACT

Client machines are configured to compile shaders during execution of a program (e.g., a video game) that renders graphics on a display. These client machines may upload information—including a hardware configuration of the client machine, an application identifier (ID) of the program, and a set of shader IDs for compiled shaders—to a remote computing system, which catalogues the shader IDs, selectively requests compiled shader code from one or more of the client machines, and selectively prepares the compiled shader code for redistribution. Thereafter, a requesting client machine with a matching hardware configuration may receive compiled shader code from the remote system for a particular program, and may precache the compiled shader code for use during program execution.

20 Claims, 8 Drawing Sheets

(56) References Cited

U.S. PATENT DOCUMENTS

| | | | |
|---|---|---|---|
| 2014/0101458 A1* | 4/2014 | Farrugia | G06F 21/125 |
| | | | 713/190 |
| 2014/0337835 A1* | 11/2014 | Johnson | G06F 9/45558 |
| | | | 718/1 |
| 2015/0022541 A1* | 1/2015 | Zelsnack | G06F 8/443 |
| | | | 345/589 |
| 2016/0078671 A1* | 3/2016 | Olsen | G06F 9/45516 |
| | | | 345/426 |

* cited by examiner

400

DISTRIBUTING SHADERS BETWEEN CLIENT MACHINES FOR PRECACHING

BACKGROUND

A shader is a program that executes on a graphics card to produce a range of visual effects on a display. Modern video games use shaders to render different materials on screen during gameplay (e.g., a matte material, a shiny material, etc.). When these programs are executed in a graphics pipeline, the shaders output per-pixel values (e.g., color values) that are combined to create an image on the display with a desired visual effect.

A game developer may write source code for shaders in a high-level programming language, such as High Level Shading Language (HLSL), OpenGL Shading Language (GLSL), or a similar programming language, and this source code is then compiled into a byte code representation of the shaders. Before shaders can be executed on a graphics card, however, the shaders are further compiled into machine code that is executable by a graphics processing unit (GPU) of the client machine. In other words, when a customer runs the game for the first time on his/her client machine, the graphics driver loads the byte code associated with the shaders, and compiles the byte code into machine code that is executable by the specific GPU of the client machine. This final shader compilation process results in compiled shader code that is unique to the hardware configuration of the client machine (e.g., unique to the GPU model and/or the version of the graphics driver). Because most game developers want their video games to execute on Personal Computer (PC) platforms with different hardware configurations, the game developer often distributes the shaders to customers in byte code format, leaving the shader compilation process to be performed at runtime on the client machine so that the particular graphics driver can compile the shader into the correct machine code for the hardware configuration in question. Console video games, by contrast, are shipped with machine code for the shaders that has already been compiled from byte code and is ready to execute by the GPU of the console. This is because the hardware configuration of the console is known to the game developer.

On a PC platform, if the shaders are compiled when the video game is loading on the client machine, the initial loading screen for the game can be presented for an undesirably long time (e.g., several minutes). This is because when the game is loading, the graphics driver will compile all of the shaders for the game's data set to create the machine code that is executable by the GPU during gameplay. Alternatively, if a game developer designs a game to compile shaders during gameplay, whenever a new material is encountered for the first time, the graphics driver will compile the shader for that material into machine code, which can take some time, potentially causing in-game stuttering or hitching (a condition where the graphics driver spends too much time compiling a shader into machine code and cannot render frames at a fast enough rate). Thus, compiling shaders locally on the client machine can result in long load times and/or in-game stuttering. Provided herein are technical solutions to improve and enhance these and other systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
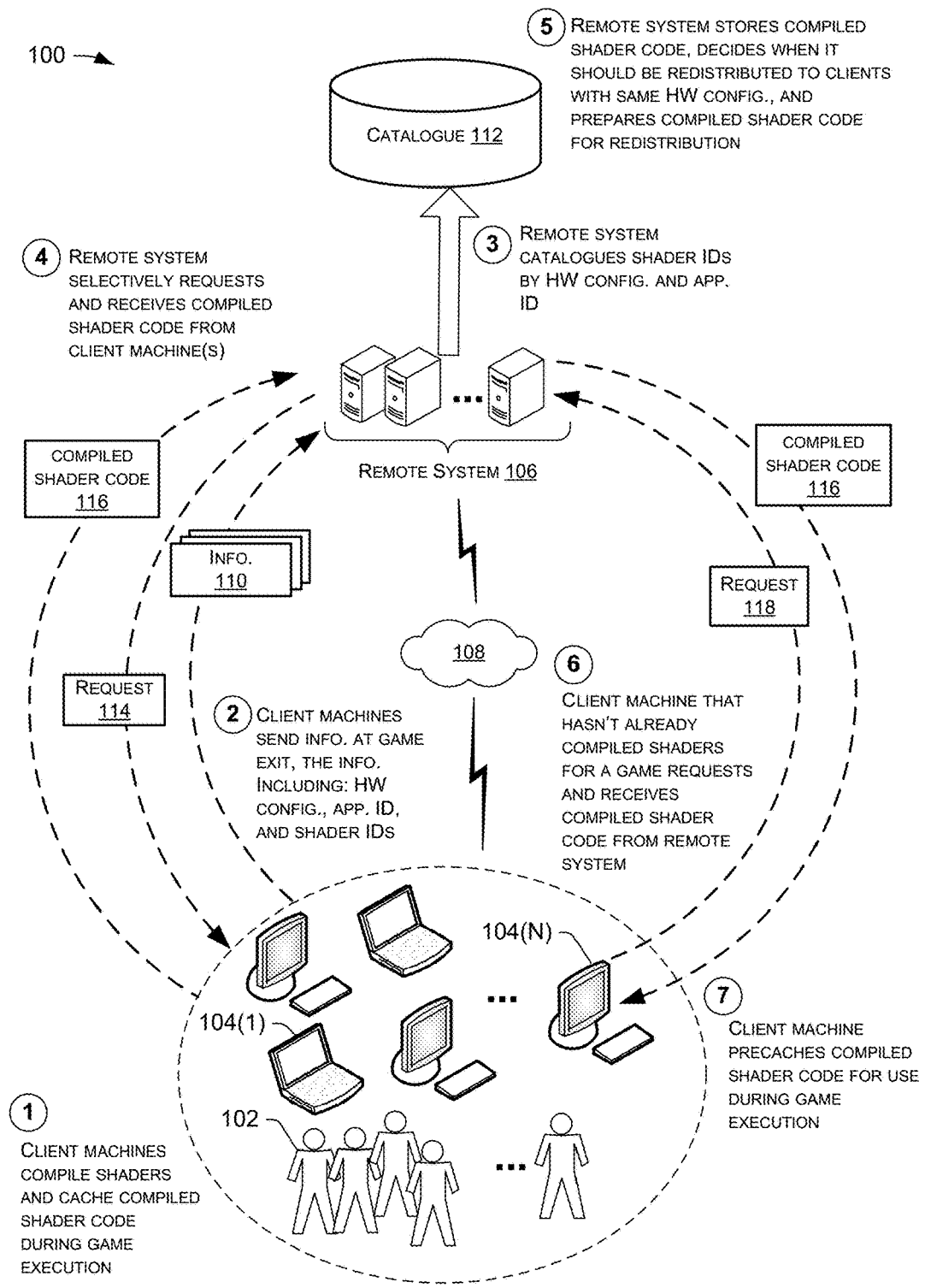
FIG. 1 is a diagram illustrating an example environment that includes a system for distributing and precaching shaders amongst client machines.

Described herein are, among other things, techniques, devices, and systems for distributing shaders between client machines for purposes of precaching compiled shaders on the client machines. Programs may be installed on a client machine and executed by a client application. Such programs may render graphics on a display associated with the client machine as part of the program's execution. An example of such a program, is a video game.

When a new video game is developed, users may start playing/executing the game on their respective client machines, and those client machines may vary by hardware configuration; the "hardware configuration," as used herein, defined by the client machine's GPU model and/or graphics driver version. Initially, when a new video game has never before been executed on a client machine, and a plurality of client machines start executing the game, the shaders (in byte code) for the game are compiled by the graphics driver on each client machine into machine code that is executable by the particular GPU on each client machine. The techniques, devices, and systems described herein pertain to reporting information to a remote computing system about compiled shaders as programs are executed on client machines, and the remote system can selectively redistribute compiled shader code to other client machines based on the hardware configuration of those machines. This allows a client machine that has not already compiled shaders for a particular program (e.g., a video game) to request and download, if available, compiled shader code from the remote computing system, and this compiled shader code can be precached on the client machine so that it can be executed in lieu of the client machine having to locally compile shaders corresponding to that shader code.

In some embodiments, a client machine is configured to send a request to a remote computing system for compiled shader code relating to a program (e.g., a video game). Such a request may be sent based on the client machine having not yet compiled shaders for the program (e.g., when the client machine installs the program, but has yet to execute the program). If the client machine receives a response from the remote computing system indicating that the compiled shader code is not available, the graphics driver of the client machine, upon program execution, may compile and cache the shaders in a predefined memory location and in association with an application identifier (ID) of the program. A client application may generate a set of shader IDs for the compiled shaders, and may send information to the remote computing system, the information including a hardware configuration of the client machine, the application ID of the program, and the set of shader IDs for the compiled shaders. This allows the remote system to collect information from client machines about shaders that are being compiled on those machines.

If, on the other hand, a client machine receives a response from the remote system indicating that the requested shader code is available, the client machine may receive the compiled shader code requested from the remote computing system. Upon receiving the compiled shader code, the client machine may precache, or store for subsequent use, at least a portion of the compiled shader code in a predefined memory location. Upon execution of the program (e.g., video game), the GPU of the client machine may execute at least the portion of the compiled shader code retrieved from the predefined memory location in lieu of the graphics driver having to create the compiled machine code on its own.

In some embodiments, a remote computing system is configured to receive information from client machines as the client machines execute programs (e.g., video games). The information received at the remote computing system for a given client machine may include a hardware configuration of the client machine, an application ID of the program executed on the client machine, and a set of shader IDs of shaders that were compiled by a graphics driver of the client machine during execution of the program. The remote computing system may catalogue the shader IDs according to hardware configuration and application ID, and may selectively request compiled shader code for one or more of the shaders that correspond to the received shader IDs. The compiled shader code may be prepared for redistribution by associating the compiled shader code with a corresponding application ID and hardware configuration. In this manner, upon receiving a request from a client machine that includes a hardware configuration of the client machine and an application ID of a particular program, the remote computing system can determine whether compiled shader code associated with a matching hardware configuration for that application ID is available. If available, the compiled shader code can be sent to the requesting client machine for subsequent execution by the GPU of the client machine (i.e., for precaching).

The techniques and systems described herein may allow one or more devices to conserve resources with respect to at least processing resources. For example, precaching of compiled shader code can reduce load times by making it unnecessary for client machines to compile shader code when a program is loaded (e.g., a program loaded for the first time) on the client machine. The techniques and systems described herein may further improve the functioning of the computer itself, such as by reducing in-game stuttering or hitching during execution of a video game. This is because precached shader code that is already compiled can be used to render graphics (e.g., materials) during execution of the program, as opposed to compiling the shader code for those materials in real-time. Furthermore, by using the remote system as a central hub that collects and redistributes compiled shader code amongst a large community of users, a single client machine may be provided with more compiled machine code than the client machine would otherwise have cached on its own. Thus, the collection of compiled shader code from a community of users may enable optimized efficiencies in executing programs that render graphics on a display.

It is to be appreciated that, although many of the examples described herein reference "shader code" that is distributed to, and precached on, client machines in compiled machine code, other types of data and/or code different from shader code may be used with the techniques and systems described herein. In fact, any byproduct of executing any type of program—whether the program renders graphics or not—may be distributed amongst a user community, especially those byproducts (data and/or code) that conserve resources and/or optimize the execution of the program on the client machine. In fact, any type of program that performs a computation(s) that results in smaller payloads at the end of the computation can benefit from the present disclosure. Thus, although "video games" are used as example programs to illustrate the various embodiments described herein, it is to be appreciated that the techniques, devices, and systems may be utilized with any type of program, other than a video game. As such, this disclosure is not limited precaching shaders for use with video games, as other programs may also benefit from precaching of any byproduct of program execution (e.g., compiled shader code, compiled JavaScript code, etc.).

FIG. 1 is a diagram illustrating an example environment 100 that includes a system for distributing and precaching shaders amongst client machines. Users 102 (sometimes referred to as "customers") of a community may be associated with one or more client machines 104. Accordingly, the client machines 104(1)-(N) shown in FIG. 1 represent computing devices that can be utilized by a user community (or customer base) to execute programs thereon. The client machines 104 can be implemented as any suitable type of computing device configured to process and render graphics on an associated display, including, without limitation, a PC, a desktop computer, a laptop computer, a mobile phone (e.g., a smart phone), a tablet computer, a portable digital assistant (PDA), a wearable computer (e.g., virtual reality (VR) headset, augmented reality (AR) headset, smart glasses, etc.), an in-vehicle (e.g., in-car) computer, a television (smart television), a set-top-box (STB), a game console, and/or any similar computing device.

The platforms (e.g., hardware and software) of the client machines 104 may vary, with subsets of the client machines 104 sharing a common hardware configuration, and the hardware configurations differing between these subsets of client machines 104. For example, a subset of the client machines 104 may each use a particular GPU model and a particular version of a graphics driver, while another subset of the client machines 104 may each use a different GPU model and/or a different version of a graphics driver. Even though a graphics driver is implemented in software (e.g., a binary), when a pair of client machines 104 are said to have the same (or a common) "hardware configuration," as used herein, this means that the pair of client machines 104 use the same GPU model and graphics driver version. In other words, "hardware configuration," as used herein, may encompass elements of software in addition to hardware.

The client machines 104 may communicate with a remote computing system 106 (sometimes shortened to "remote system 106") over a computer network 108. The computer network 108 may represent and/or include, without limitation, the Internet, other types of data and/or voice networks, a wired infrastructure (e.g., coaxial cable, fiber optic cable, etc.), a wireless infrastructure (e.g., radio frequencies (RF), cellular, satellite, etc.), and/or other connection technologies. The remote system 106 may, in some instances be part of a network-accessible computing platform that is maintained and accessible via the computer network 108. Network-accessible computing platforms such as this may be referred to using terms such as "on-demand computing", "software as a service (SaaS)", "platform computing", "network-accessible platform", "cloud services", "data centers", and so forth. In general, the remote system 106 is configured to collect both information and compiled shader code from the client machines 104, and is configured to catalogue (e.g., organize, categorize, classify, etc.) the information and the compiled shader code it receives, and distribute the compiled shader code to requesting client machines 104 for precaching the compiled shader code on those requesting client machines 104.

In some embodiments, the remote system 106 acts as, or has access to, a platform to distribute (e.g., download) programs (and content) to the client machines 104. In an example, the client machines 104 may install a client application thereon. The client application may be configured to execute programs (e.g., programs downloaded from the remote system 106) that render graphics on a display associated with the client machine 104. In the context of video game programs, an installed client application may be a video game client (e.g., gaming software to play video games). With the client application installed, a client machine 104 may then have the ability to download programs (e.g., video games) from the remote system 106 over the computer network 108. Any type of content-distribution model can be utilized for this purpose, such as a direct purchase model where programs (e.g., video games) are individually purchasable for download and execution on a client machine 104, a subscription-based model, a content-distribution model where programs are rented or leased for a period of time, and so on. Accordingly, an individual client machine 104 may include one or more installed programs that are executable by loading the client application, and these programs may render graphics on a display during execution. In an example, a user may choose to play one of multiple video games they have purchased and downloaded from the remote system 106 by loading the client application and selecting the desired video game to start execution of the video game.

Consider an example of FIG. 1 where some of the users 102 are the very first users 102 to play a new video game that is made available by the remote system 106. This group of users 102 may be the first users 102 of the general public that purchase a never-before-played game on its release date. Alternatively, this group of users 102 may be a group of "test users," or users associated with the game publisher or developer, who may get exclusive access to a pre-release copy of the game.

As shown in FIG. 1, in Step 1, as this group of first users 102 begin executing the new video game (i.e., a program that renders graphics on a display) on their respective client machines 104, the client machines 104 compile (using respective graphics drivers) a set of shaders, and the compiled shader code is used by the respective GPUs of the client machines 104 to render graphics for the program. The compiled shader code can then be cached in a predefined memory location that is accessible to the client application executing the program (e.g., the video game). The application ID of the program (e.g., video game) may also be cached in association with the compiled shader code at the predefined memory location.

In Step 2, the client machines 104, at some point in time, such as after stopping execution of the program (e.g., video game), may send information 110 to the remote system 106. The information 110 sent to the remote system 106, for a given client machine 104, may include the hardware configuration of the client machine 104, the application ID of the program (e.g., video game) executed on the client machine 104, and a set of shader IDs corresponding to the shaders that were compiled during execution of the program. The client machines 104 may generate the set of shader IDs upon reading the compiled shader code from the predefined memory location. Although FIG. 1 depicts a scenario where the information 110 is sent to the remote system 106 after client machines 104 stop execution of the program (e.g., video game), it is to be appreciated that the information 110 can be streamed from the client machines 104 in real-time, or substantially real-time, such as by streaming or otherwise sending the information 110 as the graphics drivers of those machines 104 compile and cache shader code to the predefined memory location.

The information 110 is received by the remote system 106, and, at Step 3, the remote system 106 may catalogue the set of shader IDs according to the hardware configuration and the application ID extracted from the information 110. FIG. 1 shows a catalogue 112, which represents a data repository (or data store) maintained by the remote system 106 for cataloguing shader IDs it receives from the client machines 104. Accordingly, the catalogue 112 may organize the shader IDs into groups (or buckets) that are each associated with a unique combination of hardware configuration and application ID. In other words, each bucket of shader IDs may be tied to a particular program (e.g., video game) and to a particular hardware configuration (e.g., a GPU model and graphics driver version).

At Step 4, the remote system 106 may selectively request 114 and receive compiled shader code 116 from client machines 104 that have reported the information 110 to the remote system 106. Any suitable algorithm can be utilized to selectively request 114 compiled shader code 116, as described in more detail below. In an example, the remote system 106 may receive first information 110 from a first client machine 104(1) with a first set of shader IDs. In an example implementation, as soon as the remote system 106 receives second information 110—from a second client machine 104(2) with the same hardware configuration as the first client machine 104(1)—that includes at least one shader ID that matches a shader ID previously-received from the first client machine 104(1), the remote system 106 may send a request 114 to the second client machine 104(2) for the compiled shader code 116 that corresponds to the matching shader ID. In other words, the remote system 106 may, in some embodiments, request compiled shader code as soon as it receives the same shader ID from a predefined number (e.g., two) different client machines 104 with the same hardware configuration.

After receiving compiled shader code 116, the remote system 106 may, at Step 5, store the compiled shader code 116 in association with its corresponding shader ID (and in association with the corresponding hardware configuration and application ID). In addition, at Step 5, the remote system 106 may use an algorithm to determine when to prepare the compiled shader code 116 for redistribution to other client machines 104 with the same hardware configuration. Detailed algorithms (e.g., algorithms based on popularity of the shader ID, determining whether user accounts are trusted, etc.) are described in more detail below for this purpose. Once the remote system 106 determines to redistribute compiled shader code 116 (e.g., make the compiled shader code 116 available to requesting client machines 104), the remote system 106 may prepare the compiled shader code 116 for redistribution (e.g., by building a redistributable data structure that includes the compiled shader code 116, compressing the compiled shader code 116, etc.). Accordingly, after Step 5, the remote system 106 may determine to make compiled shader code 116 for a particular application ID available to requesting client machines 104 with a particular hardware configuration.

At Step 6, a client machine 104(N) may send a request 118 to the remote system 106 to receive compiled shader code for a particular program (e.g., video game). At the time the request 118 is sent, the client machine 104(N) may be in the process of installing the program, or the client machine 104(N) may have already installed the program, and may be in the process of loading the client application. The request 118 may include the hardware configuration of the requesting client machine 104(N) and the application ID of the program, which tells the remote system 106 to look for compiled shader code 116 that may be available for the particular hardware configuration and the particular program (e.g., video game). In the running example, the remote system 106 may have previously prepared the compiled shader code 116 for the application ID and the hardware configuration specified in the request 118 from the client machine 104(N), and, hence, the requesting client machine 104(N) receives the compiled shader code 116 that is relevant for its hardware configuration, and which is relevant for the application ID in question.

At Step 7, the client machine 104(N) precaches the compiled shader code 116 in a predetermined memory location for use during execution of the program (e.g., video game). By doing so, even though the client machine 104(N) may have never before compiled shaders for the particular program (e.g., video game) in question, the client machine 104(N) is now able to leverage the compiled shader code 116 received from the remote system 106, which was previously-compiled by another client machine 104 with the same hardware configuration during execution of the program on the other client machine 104. This eliminates a computationally-intensive processing step on the client machine 104(N) (i.e., the step(s) of compiling shaders), which saves processing resources on the client machine 104(N) during execution of the program thereon (e.g., faster load time, mitigation/elimination of in-game stuttering or hitching, etc.). Depending on the algorithms used by the remote system 106 and/or the popularity of a particular video game, compiled shader code for the new video game may be made available to requesting client machines 104 within hours, and possibly within minutes, of the game's release. This is because the shader code distribution may quickly ramp up when many users start playing the video game immediately upon its release. Furthermore, groups of test users may start to generate compiled shader code 116 even before a release date of the video game, which may make at least some compiled shader code 116 available to the first users of the general public when they start playing the game.

Figure 2:
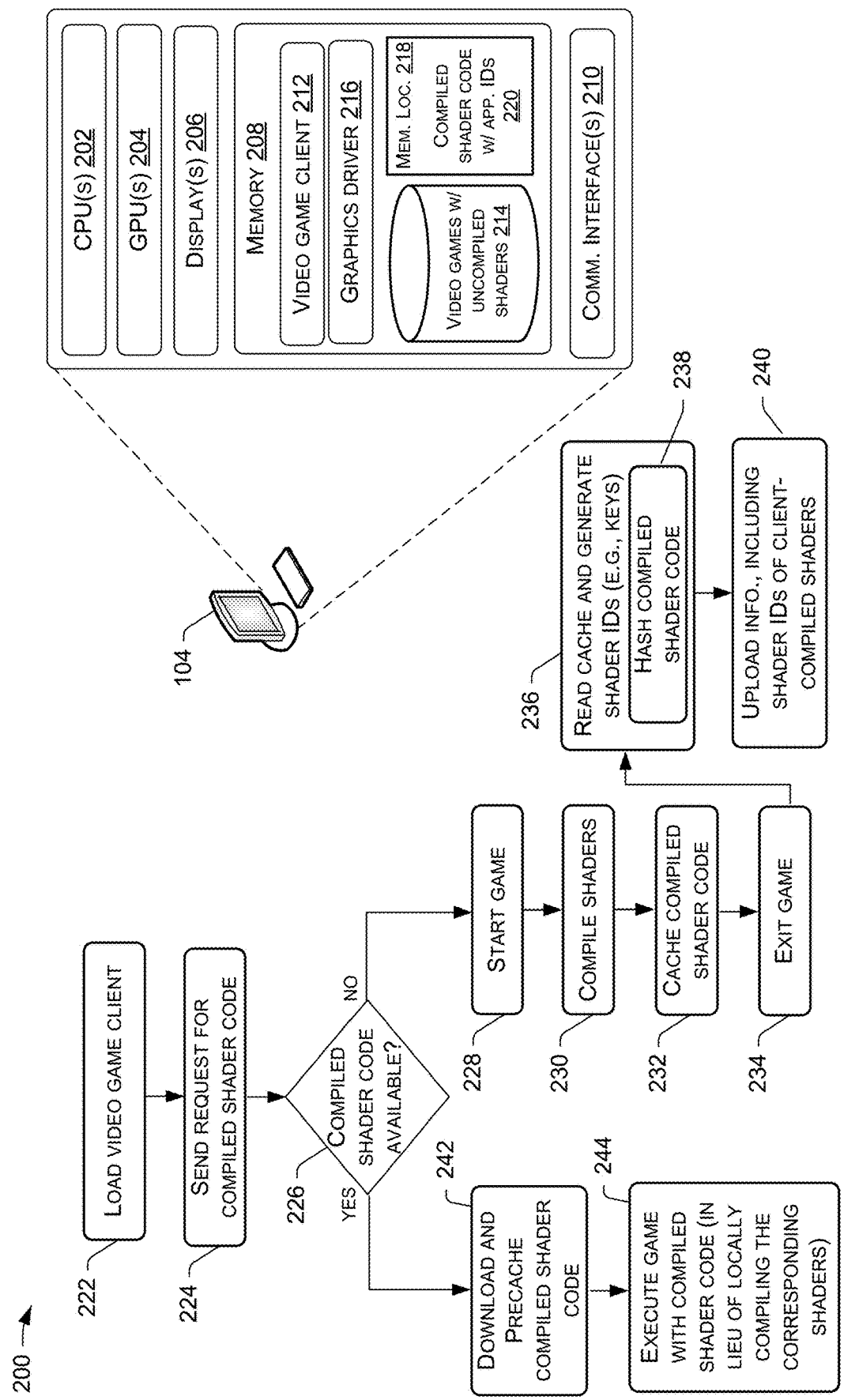
FIG. 2 shows a block diagram illustrating example components of a client machine and a flow diagram of an example process for uploading and/or downloading compiled shaders to/from a remote computing system.

FIG. 2 shows a block diagram illustrating example components of a client machine 104 and a flow diagram of an example process 200 for uploading and/or downloading compiled shaders to/from the remote computing system 106 of FIG. 1. In the illustrated implementation, the client machine 104 includes, among other components, processors, such as a central processing unit(s) (CPU) 202 and a graphics processing unit(s) (GPU) 204, a display(s) 206, memory 208 (or non-transitory computer-readable media 208), and a communications interface(s) 210. Although the example client machine 104 of FIG. 2 suggests that the client machine 104 includes an embedded display 206, the client machine 104 may in fact omit a display, but may, instead, be coupled to a peripheral display 206. Thus, the display 206 is meant to represent an associated display 206, whether embedded in the client machine 104, or connected thereto (through wired or wireless protocols).

The memory 208 (or non-transitory computer-readable media 208) may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 208 may be implemented as computer-readable storage media ("CRSM"), which may be any available physical media accessible by the processor(s) 202/204 to execute instructions stored on the memory 208. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 202/204.

Reference is now made to the process 200 shown in FIG. 2. The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 2 is a flow diagram of an example process 200 for uploading and/or downloading compiled shaders to/from the remote computing system 106 of FIG. 1. For discussion purposes, it is assumed that the client machine 104 performing the process 200 has previously installed a client application (e.g., a video game client 212) that is configured to execute a program that renders graphics on an associated display 206. Such programs can be installed (e.g., downloaded from the remote system 106) and maintained in the memory 208. In the example of FIG. 2, the programs are video games, and when the video games are first installed on the client machine 104, the video games are maintained in the memory 208 as video games with uncompiled shaders 214 (or shaders in byte code representation prior to compiling the shaders during gameplay).

At 222, a user 102 of the client machine 104 may load the video game client 212 (i.e., a client application configured to execute one of multiple installed programs that render graphics on the display 206). The loaded video game client 212 provides the user 102 with the ability to execute a previously downloaded video game with uncompiled shaders 214, and/or download a new video game as a video game with uncompiled shaders 214.

At 224, the client machine 104 may send a request 118 to a remote computing system 106 for compiled shader code for a video game (here, the video game represents a program that renders graphics on the display 206 during program execution). The request 118 sent at block 224 may be triggered in various ways, such as by the user 102 loading the video game client 212 at block 222 and/or the user 102 downloading a new video game. In the latter case, the request 118 may be transmitted before, during, or after the downloading of the new video game. The request 118 sent at block 224 may include (or specify) a hardware configuration of the client machine 104, such as the model of the GPU 204, and/or the version of a graphics driver 216. The request 118 sent at block 224 may further include (or specify) one or more application IDs corresponding to one or more video games with uncompiled shaders 214. For example, the video game client 212 may, at block 224, enumerate all of the installed video games for which there are uncompiled shaders 214 and send corresponding application IDs of those games to the remote system 106 along with the client machine's 104 hardware configuration.

At block 226, the client machine 104 may determine whether compiled shader code is available for a program(s) based on a response from the remote system 106. For instance, the remote system 106 may respond to the request 118 sent at block 224 by providing an indication that the requested shader code is not available for download. This may be the case for various reasons, as will be described in more detail below. In at least some instances, the remote system 106 may possess the compiled shader code requested by the client machine 104, but may have determined not to make it available for redistribution. If the client machine 104 receives an indication that the requested shader code is not available, the process 200 follows the "no" route from block 226 to block 228 where, responsive to user input, the client machine 104 may start the video game with uncompiled shaders 214 (i.e., execute the video game program on the client machine 104).

At 230, the graphics driver 216 of the client machine 104 may compile a set of shaders (as compiled shaders) into machine code that is executable by the GPU 204. The compiling at block 230 may include compiling a byte code representation of the shaders to a low-level machine code representation of the shaders that is executable by the GPU 204 and specific to the particular model of the GPU 204. The compiling at block 230 may be performed when the game loads, and/or during gameplay.

At 232, the graphics driver 216 may cache the compiled shaders (compiled shader code 116) in a predefined memory location 218 and in association with an application ID of the video game. This is shown in FIG. 2 as "compiled shader code with application IDs 220". In some embodiments, the video game client 212 may instruct (using an application programming interface (API)) the graphics driver 216 to store compiled shader code 116 at the predefined memory location 218, which may be a different location than a typical system location generally uses to store on-disk cache. This instruction to store compiled shader code 116 at the predefined memory location 218 may occur contemporaneously with the caching at block 232, or at a point in time prior to the caching at block 232. The predefined memory location 218 where the graphics driver 216 is to store compiled shader code 216 may be a directory that is associated with the particular video game in question. In this manner, the compiled shader code 116 may be stored in directories corresponding to different video games (directories tagged with application ID).

At 234, the video game may be stopped or exited (e.g., in response to the user 102 quitting the game, etc.). Thus, at block 234, the client machine 104 may stop execution of the video game. At this point in time, for any shaders that were compiled during execution of the video game, there will be corresponding compiled shader code 116 cached in the predefined memory location 218 in association with an application ID of the video game.

At 236, the video game client 212, in response to stopping execution of the video game, may open and read/parse the cached shader code 116 (e.g., by opening a folder in the predefined memory location 218 and reading/parsing its contents) to generate (or otherwise obtain) shader IDs for the shaders that were compiled during execution of the video game. In some embodiments, the shader IDs are in the form of shader keys that are generated internally by the cache of the graphics driver 216 and subsequently read out by the video game client 212 from the cache entries at block 236. In some embodiments, the shader IDs are provided with the uncompiled shader code when the video game is downloaded, and these shader IDs are then read out from the cache entries at block 236. In some embodiments, the shader IDs are generated by the video game client 212 based on the compiled shader code 116 in a deterministic manner such that all client machines 104 with the same hardware configuration that compile shaders in the same way will generate the same shader IDs (or shader keys).

As shown at sub-block 238, the video game client 212 may also hash the machine code for the compiled shaders that is read from the cached entries, and this hash may be sent with the shader IDs (or shader keys) in a set of tuples (each tuple comprising a shader ID/key and a hash of the compiled machine code for the shader) to the remote system 106.

At 240, the client machine 104 may send (or upload) information 110 to the remote system 106, the information including at least the set of shader IDs of the shaders that were compiled by the client machine 104. The information 110 sent at block 240 may further include the hardware configuration of the client machine 104, the application ID of the video game, and/or the hash of the machine code for the compiled shaders. Any or all of this information 110 may be sent in a "shader usage report" that is consumed by the remote system 106 upon receipt. In an example, a single shader usage report sent by a single client machine 104 may include information (e.g., shader IDs, etc.) for upwards of tens of thousands of shaders for a single video game, especially if the video game is played for the first time on the client machine 104. The branch of the process 200 stemming from the "no" route following block 226 represents a "telemetry" approach for collecting shader-related information at the remote system 106. Considering that a large number of client machines 104 may be performing the process 200, the remote system 106 may collect the described information 110 that is uploaded at block 240 from a vast number of client machines 104 having different hardware configurations.

Although FIG. 2 depicts a scenario where the information 110 is sent (or uploaded) to the remote system 106 at block 240 after the client machine 104 stops execution of the program (e.g., video game) at block 234, it is to be appreciated that the information 110 can be sent (e.g., by streaming) in real-time, or substantially real-time, to the remote system 106. For example, instead of waiting to exit the game at block 234 before uploading the information 110 at block 240, the client machine 104 may stream or otherwise send the information 110 in real-time as the graphics driver compiles and caches the shader code.

Returning to block 226, if the remote system 106 has compiled shader code available for the requesting client machine 104 to precache, the process 200 may follow the "yes" route from block 226 to block 242 where the client machine 104 receives (or downloads) the compiled shader code 116 corresponding to the hardware configuration and an application ID of the video game in question, and the client machine 104 precaches (or stores for subsequent use) at least a portion of the compiled shader code 116 at the predefined memory location 218. In order to download the compiled shader code 116, the remote system 106 may provide the client machine 104 with information (e.g., an identifier, uniform resource locator (URL), etc.) to tell the client machine 104 where to go to download the compiled shader code 116. The client machine 104 may download the compiled shader code 116 in compressed form (e.g., in zip files).

At 244, the client machine 104 may execute the video game, wherein executing the video game includes the GPU 204 executing at least the portion of the compiled shader code 116 retrieved from the predefined memory location 218 in lieu of the graphics driver 216 of the client machine 104 creating the compiled shader code itself. That is, the precaching at block 242 saves the client machine 104 from having to compile shaders itself. Instead, the downloaded shader code 116 can be utilized during game execution for optimizing performance of program execution.

Figure 3:
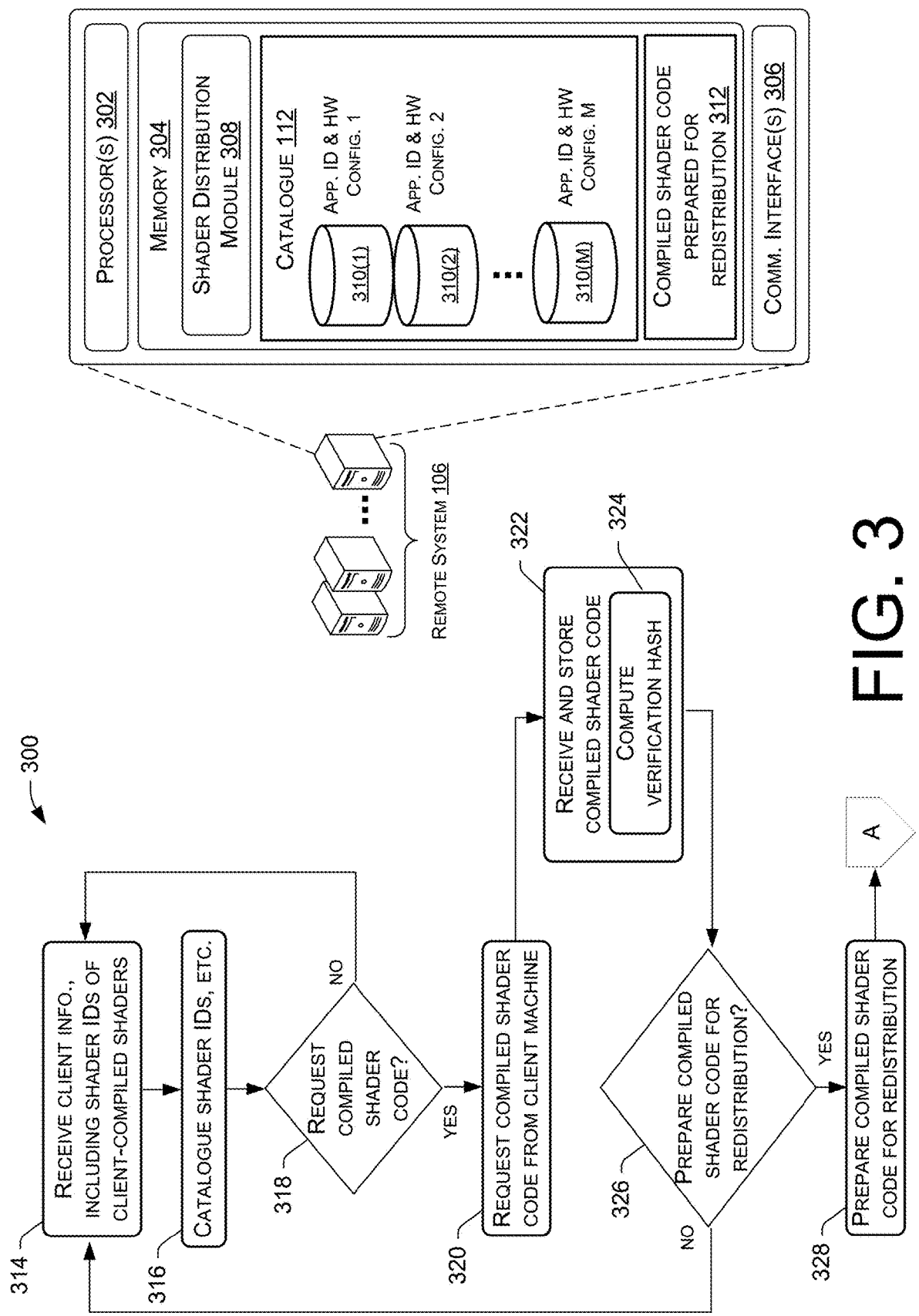
FIG. 3 shows a block diagram illustrating example components of a remote computing system and a flow diagram of an example process for receiving information from client machines, cataloguing shader identifiers (IDs) included in the received information, selectively requesting compiled shader code, and selectively preparing the compiled shader code for redistribution.

FIG. 3 shows a block diagram illustrating example components of a remote computing system 106 and a flow diagram of an example process 300 for receiving information 110 from client machines 104, cataloguing shader IDs included in the received information 110, selectively requesting compiled shader code 116, and selectively preparing the compiled shader code 116 for redistribution. In the illustrated implementation, the remote system 106 includes, among other components, one or more processors 302, memory 304 (or non-transitory computer-readable media 304), and a communications interface(s) 306. The memory 304 (or non-transitory computer-readable media 304) may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 304 may be implemented as computer-readable storage media ("CRSM"), which may be any available physical media accessible by the processor(s) 302 to execute instructions stored on the memory 304. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 302. A shader distribution module 308 may represent instructions stored in the memory 304 that, when executed by the processor(s) 302, cause the remote system 106 to perform the techniques and operations described herein.

Reference is now made to the process 300 shown in FIG. 3. At 314, the remote system 106 may receive information 110 from client machines 114 (e.g., as part of the "telemetry" branch—following the "no" route from block 226—of the process 200, described above). The received information 110 sent by a particular client machine 104 may include, at least a set of shader IDs of shaders that were compiled by a graphics driver 216 of the client machine 104 during execution of a video game on the client machine 104. Moreover, the information 110 received at block 314 may include additional information in a "shader usage report," such as a hardware configuration of the client machine 104, an application ID of a video game that was executed, hashes of the machine code for the compiled shaders, a device ID of the client machine 104, and the like.

At 316, the remote system 106 may catalogue the set of shader IDs it receives at block 314 by (or according to) hardware configuration and application ID. For example, the catalogue 112 may include multiple groups or buckets 310(1)-(M) that are classified by a unique combination of application ID and hardware configuration. Taking, for example, a first client machine 104(1) with hardware configuration "1", when a first set of shader IDs are received at block 314 from the first client machine 104(1), the first set of shader IDs may be catalogued at block 316 into a first bucket 310(1) (or group), and this bucket 310(1) may be tagged with the application ID and the hardware configuration of the first client machine 104(1) extracted from the information 110 received from the first client machine 104(1) at block 314. Likewise, a second client machine 104(2) may send a second set of shader IDs, and this second set of shader IDs may be catalogued at block 316 into a second bucket 310(2), which may be tagged with the application ID and a second hardware configuration "2" of the second client machine 104(2) extracted from the information 110 received from the second client machine 104(2) at block 314. This can continue for any number of "M" buckets, depending on the number of client machines 104 reporting telemetry information, depending on whether those client machines 104 have different hardware configurations, and/or depending on how many different games are being executed on those client machines 104.

At 318, the remote system 106 may determine whether to request compiled shader code for any received shader IDs. The algorithms for making this determination at block 318 may vary, as will be described in more detail below.

If the remote system 106 determines, for the time being, not to request compiled shader code at block 318, the process 300 may follow the "no" route from block 318 back to block 314 where the remote system 106 continues to collect/receive information 110 (e.g., shader usage reports) from client machines 104. When the remote system 106 determines to request compiled shader code for a received shader ID(s), the process 300 may follow the "yes" route from block 318 to block 320 where the remote system 106 sends a request 114 for compiled shader code for one or more shaders corresponding to shader IDs the remote system 106 has received.

At 322, the remote system 106 may receive the compiled shader code 116 it requested from a particular client machine 104, and the remote system 106 may store the compiled shader code in association with the corresponding shader ID(s) (e.g., in the catalogue 112). To illustrate, if the remote system 106 requests compiled shader code for one or more of the shader IDs in the first bucket 310(1), and this request is sent to a client machine 104 with the hardware configuration that the first bucket 310(1) is tagged with, the remote system 106 may store the received shader code in the first bucket 310(1) and in association with the corresponding shader ID(s).

As shown by the sub-block 324, the remote system 106 may compute a verification hash before storing the received shader code to make sure it is valid code. That is, the remote system 106 may hash the compiled shader code received from a client machine 104 at block 322 to generate a verification hash of the compiled shader code. Recall that a hash of compiled shader code may be received in the information 110 at block 314. Accordingly, the verification hash computed at block 324 may be compared to a previously-received hash that is stored in a tuple with the corresponding shader ID in the catalogue 112. If the verification hash matches the hash of the compiled shader code that was previously-received from a client machine 104 and catalogued, the code can be considered valid/authentic, and the compiled code may be stored by the remote system 106 at block 322.

At 326, the remote system 106 may determine whether to prepare compiled shader code for redistribution as "compiled shader code prepared for redistribution 312". The algorithms for making the determination at block 326 may vary, as will be described in more detail below.

If the remote system 106 determines, for the time being, not to prepare compiled shader code for redistribution at block 326, the process 300 may follow the "no" route from block 326 back to block 314 where the remote system 106 continues to collect/receive information 110 (e.g., shader usage reports) from client machines 104. When the remote system 106 determines to prepare compiled shader code for redistribution, the process 300 may follow the "yes" route from block 326 to block 328 where the remote system 106 may create "compiled shader code prepared for redistribution 312" by associating the compiled shader code with the corresponding application ID and the hardware configuration. In an example, the remote system 106 may build a redistributable representation (or data structure) of compiled shader code for a given application ID and hardware configuration (i.e., for a given bucket 310), and this code can be archived in a location where it is ready to be distributed to client machines 104 upon request. In some embodiments, the compiled shader code may be prepared for redistribution 312 by compressing the compiled shader code, such as by creating a zip file, or the like.

Figure 4:
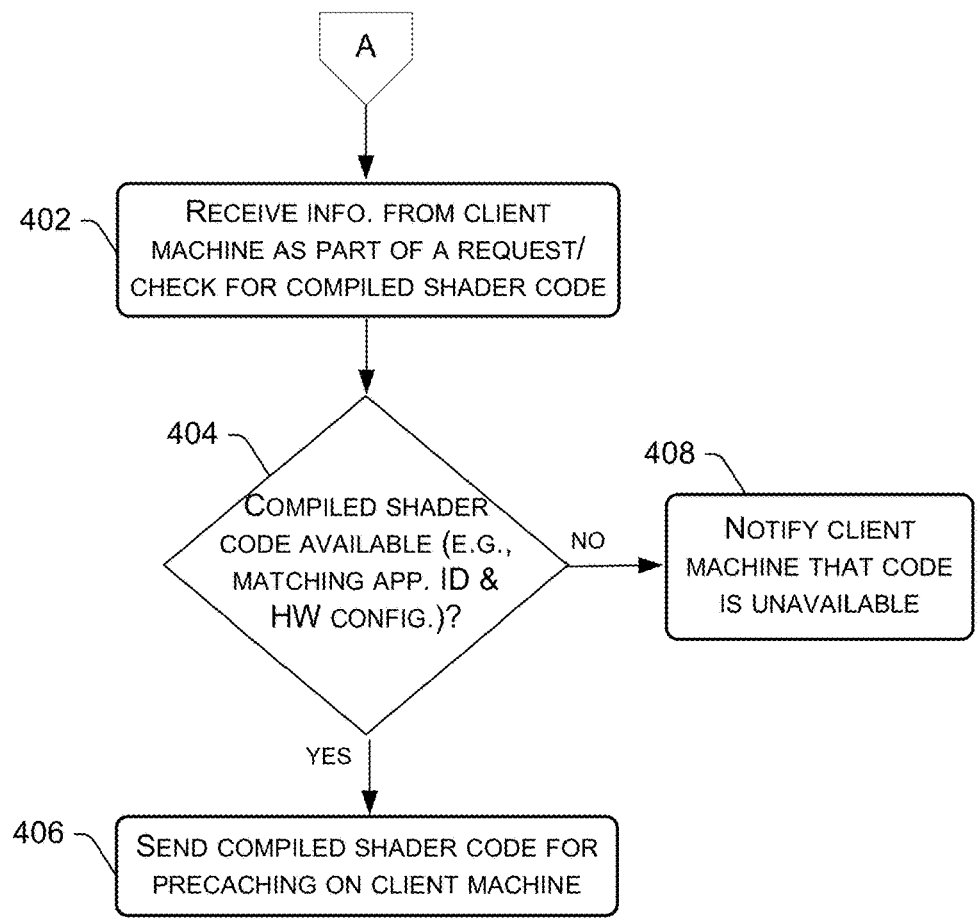
FIG. 4 is a flow diagram of an example process for sending compiled shader code to a requesting client machine based on a hardware configuration of the client machine.

FIG. 4 is a flow diagram of an example process 400 for sending compiled shader code to a requesting client machine 104 based on a hardware configuration of the client machine 104. As shown by the off-page reference "A" in FIGS. 3 and 4, the process 400 may continue from block 328 of FIG. 3, such as after compiled shader code has been prepared by the remote system 106 and is available to requesting client machines 104 for precaching on those requesting client machines 104.

At 402, the remote system 106 may receive information from a client machine 104 as part of a request 118 for compiled shader code pertaining to a particular hardware configuration of the client machine 104 and pertaining to an application ID of a particular program (e.g., video game). Accordingly, the information received at block 402 may include a hardware configuration of the requesting client machine 104 and an application ID corresponding to a program (e.g., a video game) that may be installed, or is currently installing, on the client machine 104.

At 404, the remote system 106 may determine whether any compiled shader code is available for the hardware configuration of the client machine 104 and the application ID associated with the request. In an example, the remote system 106 may analyze the prepared shader code 312 to determine if any of the compiled shader code that has been prepared for redistribution 312 is associated with a matching hardware configuration and a matching application ID. If a matching hardware configuration and a matching application ID are found, this indicates that another client machine 104 with a matching hardware configuration had previously executed the same program (e.g., video game) and compiled shader code during execution of the program, and also that the remote system 106 had subsequently received the compiled shader code and prepared it for redistribution. If this is the case, the process 400 may follow the "yes" route from block 404 to block 406 where the remote system 106 may send the compiled shader code to the requesting client machine 104 for execution by a GPU 204 of the client machine 104 while executing the video game with the application ID on that client machine 104.

If, on the other hand, the remote system 106 determines, at block 404, that there is no compiled shader code available for the particular hardware configuration and application ID of the requesting client machine 104, the process 400 may follow the "no" route from block 404 to block 408 where the remote system 106 may notify the client machine that the requested shader code is unavailable.

Figure 5:
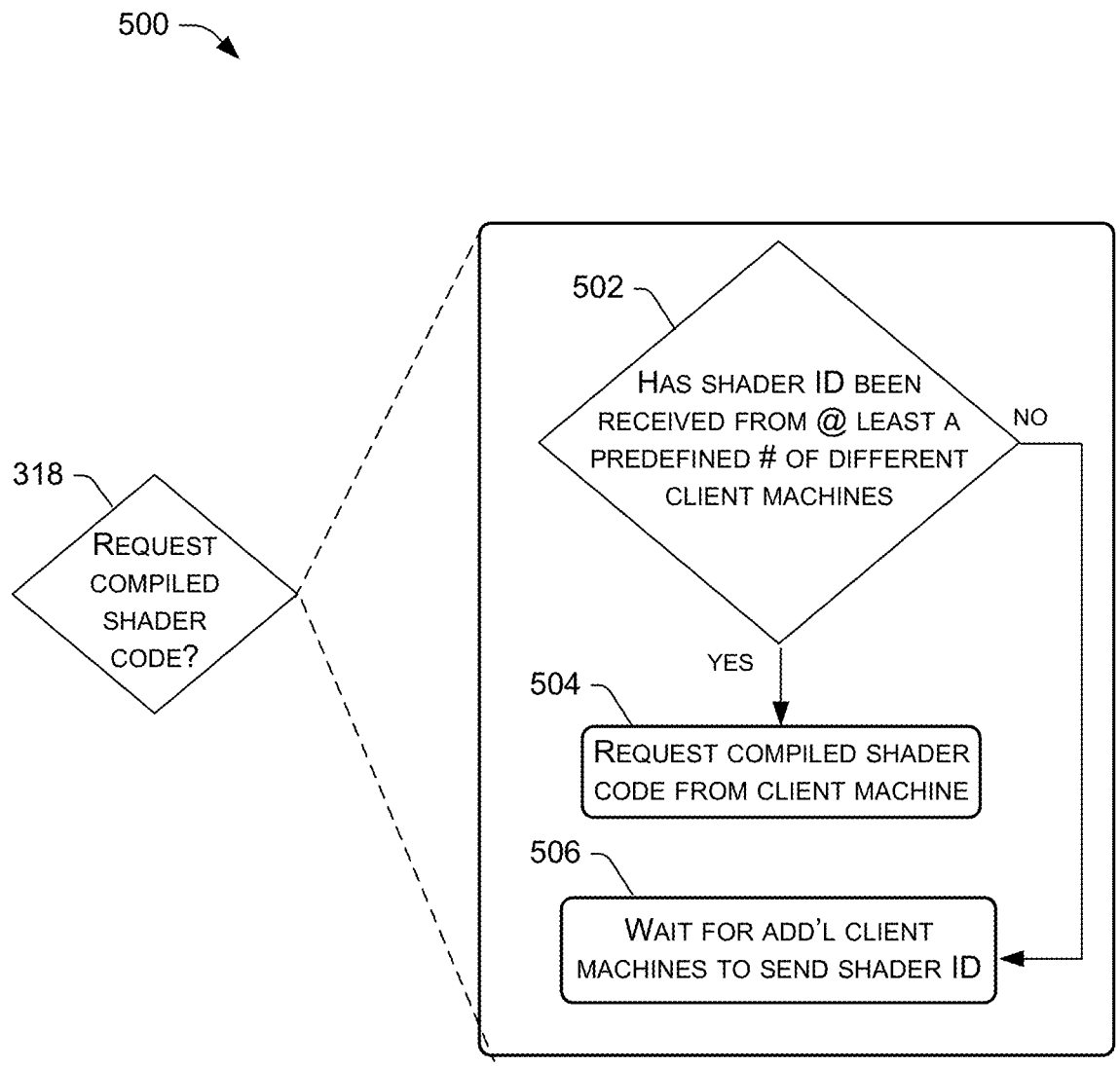
FIG. 5 is a flow diagram of an example process for selectively requesting compiled shader code.

FIG. 5 is a flow diagram of an example process 500 for selectively requesting compiled shader code. As indicated, the process 500 may represent a sub-process of the operation(s) at block 318 of the process 300 of FIG. 3, and the process 500 may be performed after the remote system 106 has received at least one shader ID (or shader key).

At 502, after having received client information 110 including shader IDs (or shader keys) from client machines 104 as a result of executing video games on the client machines 104, the remote system 106 may determine, for a given shader ID received from a client machine 104, whether the remote system 106 has received that shader ID from at least a predefined number of different client machines 104. The predefined number is configurable. If the remote system 106 has received the same shader ID from at least the predefined number of different client machines 104, the process 500 may follow the "yes" route from block 502 to block 504 where the remote system 106 may send a request 114 to a client machine 104 that sent the shader ID to the remote system 106 for compiled shader code 116 corresponding to the shader ID.

If, on the other hand, the remote system 106 has not received the same shader ID from at least the predefined number of different client machines 104, the process 500 may follow the "no" route from block 502 to block 506 where the remote system 106 can wait for additional client machines 104 to send shader IDs and iterate the process 500 following newly received shader IDs.

The predefined number at block 502 is configurable. If the predefined number is two, the remote system 106 requests compiled shader code 116 as soon as it receives the same shader ID from two different client machines 104. If the predefined number is greater than two, the remote system 106 waits until more client machines 104 send the same shader ID before requesting compiled shader code 116. In some embodiments, an additional criterion to be satisfied before requesting compiled shader code at block 504 may be that the different client machines have the same hardware configuration. That is, for a predefined number set to "two," the request for compiled shader code 504 may be triggered upon the remote system 106 receiving the same shader ID (or shader key) from two different client machines 104 having the same hardware configuration (e.g., the same GPU model and the same version of graphics driver). Thus, the process 500 is an example of selectively requesting compiled shader code, rather than requesting compiled shader code immediately upon receipt of a corresponding shader ID.

Figure 6:
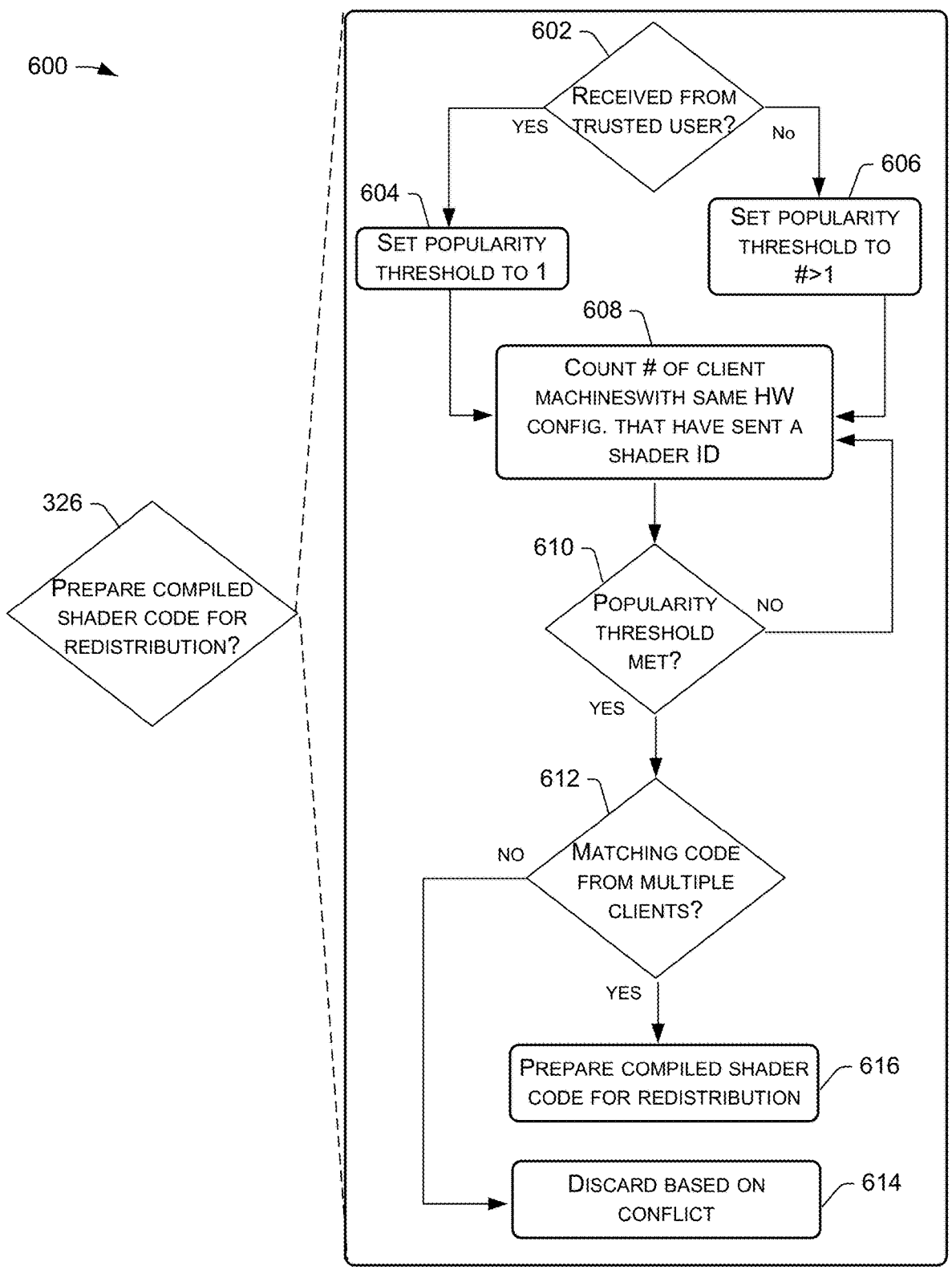
FIG. 6 is a flow diagram of an example process for selectively preparing compiled shader code for redistribution.

FIG. 6 is a flow diagram of an example process 600 for selectively preparing compiled shader code for redistribution. As indicated, the process 600 may represent a subprocess of the operation(s) at block 326 of the process 300 of FIG. 3, and the process 600 may be performed after the remote system 106 has received compiled shader code from one or more client machines 104.

At 602, after having requested and received compiled shader code 116 from a client machine 104, the remote system 106 may determine whether a user account associated with the client machine 104 that sent the compiled shader code 116 is a trusted account. For example, the remote system 106 may maintain a list of trusted user accounts that it can check against at block 602. These trusted user accounts may be associated with users/client machines that have legally obtained a license to a video game in question. Additionally, or alternatively, the trusted user accounts may be tied to the game publisher or developer (e.g., users that execute the video game ahead of a release date), and/or accounts of users who operate a testing lab where trusted users are tasked with testing the video game for bugs and other issues before it is released to the general public. The remote system 106 is configured to automatically trust such users and, hence, the compiled shader code 116 received therefrom.

If the determination at block 602 is that the compiled shader code 116 was received from a trusted user account, the process 600 may follow the "yes" route from block 602 to block 604 where a popularity threshold may be set to 1. Otherwise, if the remote system 602 cannot trust the user 102 and/or machine 104 that sent the compiled shader code, the process 600 may follow the "no" route from block 602 to block 606 where a popularity threshold may be set to a number that is greater than 1 (e.g., a popularity threshold of 10).

At 608, the remote system 106 may count—for a particular shader ID (or shader key) that has been catalogued into a group (or bucket 310) having a particular hardware configuration and a particular application ID—a number of different client machines 104 that have sent the particular shader ID to the remote system 106. In other words, the remote system 106 may monitor the number of different client machines 104 with the same hardware configuration reporting the same shader ID (or shader key) and the same application ID.

At 610, the remote system 106 may determine if the count (or number of different client machines 104 reporting the same shader ID) meets or exceeds the popularity threshold. If that number does not meet the popularity threshold at block 610, the process 600 may follow the "no" route from block 610 back to block 608 where the remote system 106 continues counting (or otherwise monitoring) the number of client machines 104 reporting the shader ID. If the count (i.e., the number of different client machines 104 reporting the same shader ID) meets or exceeds the popularity threshold at block 610, the process 600 may follow the "yes" route from block 610 to block 612 where an optional verification step can be performed to determine whether the received shader code matches compiled shader code received from one or more additional client machines 104. In other words, the remote system 106 may request and receive what it believes to be the same compiled shader code 116 from multiple different client machines 104 that have reported the same shader ID, and may compare the compiled shader code 116 received from the different client machines 104 at block 612. If there is a conflict detected at block 612—based on a comparison of the compiled shader code from different client machines 104, the process 600 may follow the "no" route from block 612 to block 614 where the received shader code may be discarded based on the detected conflict. The non-matching shader code from client machines 104 with the same hardware configuration may indicate that one of the client machines 104 is providing "fake" code, which may be corrupt or include malware.

If the verification step passes muster at block 612—by determining that the received shader code is the same (matching) from different client machines, the process 600 may follow the "yes" route from block 612 to block 616 where the remote system 106 prepares the compiled shader code for redistribution (See 312 of FIG. 3), such as by building a redistributable data structure and associating the compiled shader code (in the redistributable data structure) with the corresponding application ID and the hardware configuration.

Because the popularity threshold of FIG. 6 is configurable, the remote system 106 can be tuned according to the perceived trust of the community and/or the risk and/or the sensitivity of unintentionally distributing corrupt or malicious code. Also, it is to be appreciated that setting the popularity threshold to 1 at block 604 (which occurs when a user account is determined to be a trusted account) effectively results in a distilled version of the process 600 where compiled shader code received from a trusted user is automatically or immediately prepared for redistribution because the remote system 106 does not wait for any other client machines to send the same shader ID corresponding to that shader code, and the remote system 106 will not have any other shader code in order to verify the shader code received from the trusted user account (not that there is a need to).

Figure 7:
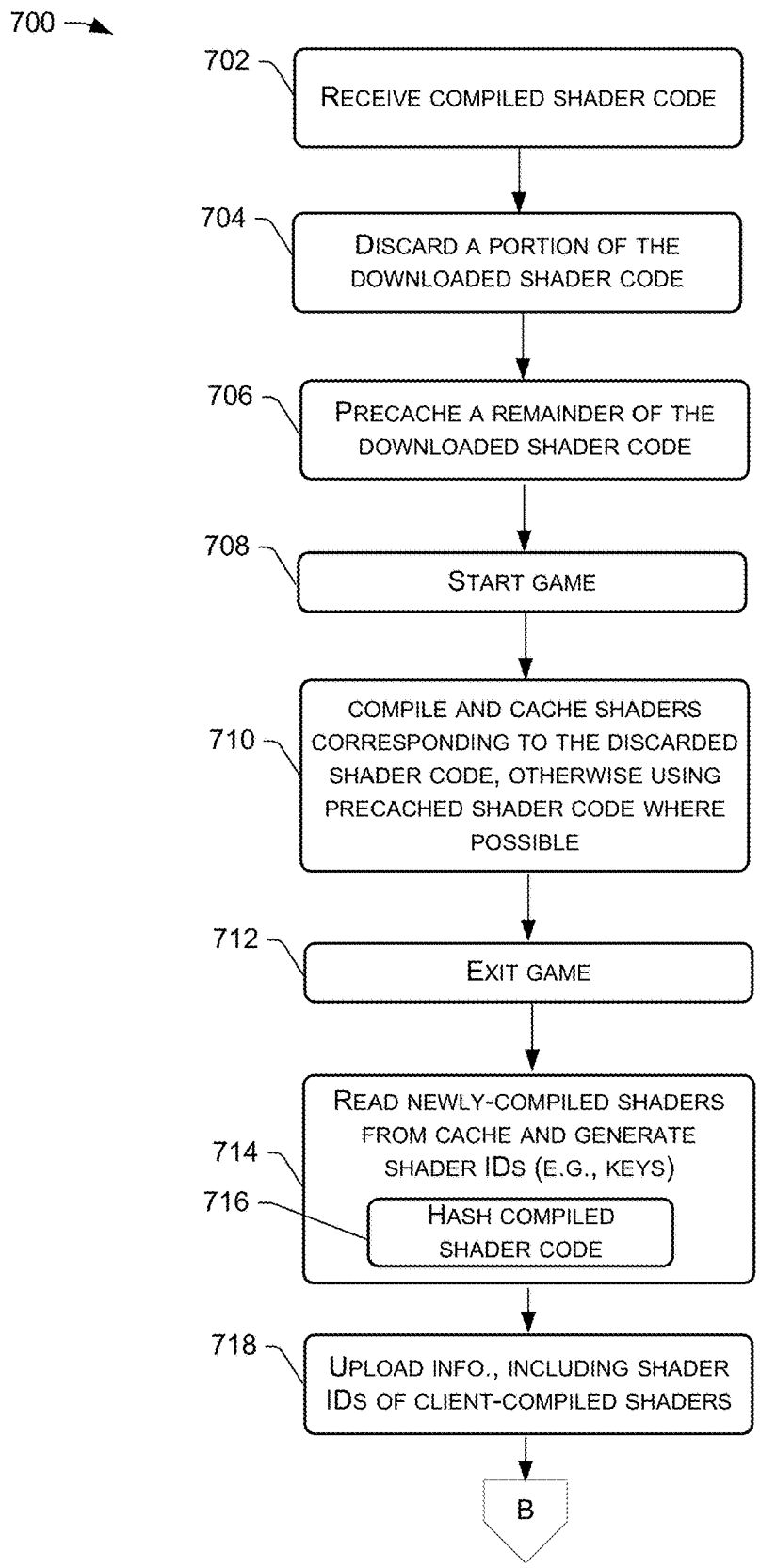
FIG. 7 is a flow diagram of an example process for implementing an integrity check by discarding a portion of downloaded shader code, re-compiling the shaders corresponding to the discarded shader code, and uploading information for the re-compiled shaders.

FIG. 7 is a flow diagram of an example process 700 for implementing an integrity check by discarding a portion of downloaded shader code, re-compiling the shaders corresponding to the discarded shader code, and uploading information for the re-compiled shaders.

At 702, a client machine 104—after having requested compiled shader code from the remote system 106, as described herein—may receive compiled shader code 116 for the client machine's 104 hardware configuration and for an application ID of a program (e.g., video game) in question.

At 704, the client machine 104 may discard at least some of the compiled shader code 116 as discarded shader code. For instance, the client machine 104 may be part of a random subset of client machines 104 that are configured (e.g., via the video game client 212 receiving an instruction from the remote system 106, and/or hard coded instructions, etc.) to discard a portion (e.g., 10%) of compiled shaders it receives from the remote system 106, notwithstanding the assumption that it is "good" shader code (i.e., not corrupt, and/or does not include malware, etc.). The number of client machines 104 discarding shader code in this manner may be configurable by the remote system 106, and may represent a small portion (e.g., 10%) of the user population that is executing video games.

At 706, the client machine 104 may precache a remainder of the compiled shader code other than the discarded shader code. The remainder of the compiled shader code may be stored at a predefined memory location 218.

At 708, the client machine 104 may start executing a video game that uses shaders corresponding to the received shader code, at least a portion of which is cached at the predetermined memory location 218.

At 710, the client machine 104 may compile and cache shaders corresponding to the discarded shader code. This can be done during a loading screen, or during execution of the game in real-time. When it comes time to utilize shaders corresponding to the received shader code that was pre-cached at block 706, the GPU 204 of the client machine 104 executes the compiled shader code in lieu of the graphics driver 216 compiling the corresponding shaders on its own, which conserves resources of the client machine 104.

At 712, the video game client 212 may stop execution of the game, such as in response to the user 102 quitting the video game.

At 714, the video game client 212, in response to stopping execution of the video game, may open and read/parse the cached shader code 116 for the newly compiled shaders (those shaders compiled at block 710) to generate shader IDs (or shader keys) for those newly-compiled shaders.

As shown at sub-block 716, the video game client 212 may also hash the machine code for the newly-compiled shaders, and this hash may be sent with the shader IDs (or shader keys) in a set of tuples (each tuple comprising a shader ID/key and a hash of the compiled machine code for the shader) to the remote system 106.

At 718, the client machine 104 may send (or upload) information 110 to the remote system 106, the information 110 including at least the set of shader IDs of the newly-compiled shaders that were compiled by the client machine 104. The information 110 sent at block 718 may further include the hardware configuration of the client machine 104, the application ID of the video game executed at block 708, and/or the hash of the machine code for the compiled shaders. Any or all of this information 110 may be sent in a "shader usage report" that is consumed by the remote system 106 upon receipt.

Figure 8:
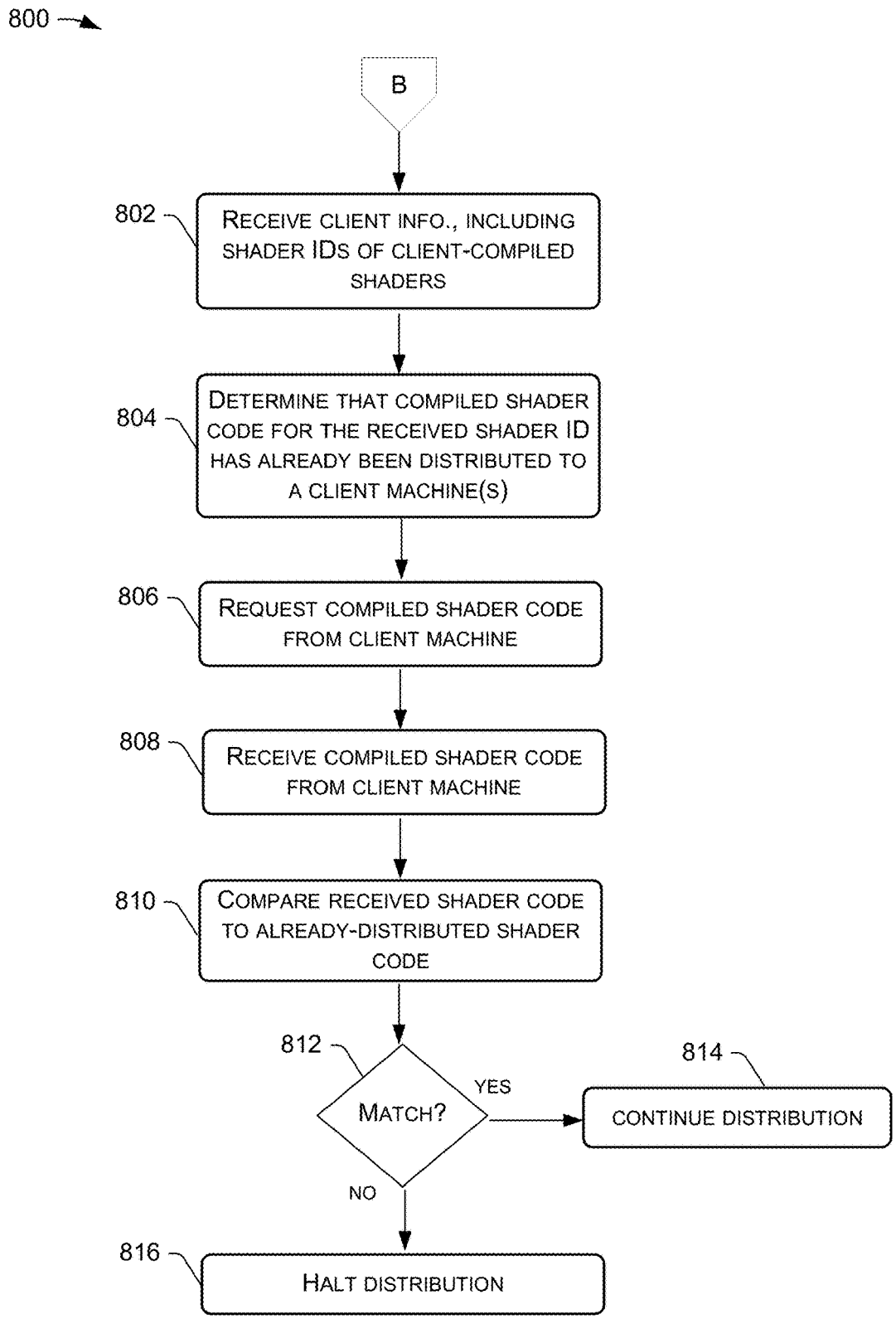
FIG. 8 is a flow diagram of an example process for halting further distribution of already-distributed shader code using the integrity check of the process of FIG. 7.

FIG. 8 is a flow diagram of an example process 800 for halting further distribution of already-distributed shader code using the integrity check of the process 700 of FIG. 7. The off-page reference "B" in FIGS. 7 and 8 indicates that the process 800 can continue from block 718 of the process 700 of FIG. 7.

At 802, the remote system 106 may receive information 110 from client machines 114 (e.g., as part of the "telemetry" branch of the process 200, described above). Continuing from the process 700, this information 110 received at block 802 may include at least a set of shader IDs of newly-compiled shaders corresponding to shader code that was discarded (at block 704 of the process 700) by the transmitting client machine 104, and this client machine 104 may be associated with a trusted user account (e.g., one who is designated to intentionally discard compiled shader as part of an integrity check on the system). Moreover, the information 110 received at block 802 may include additional information provided in a "shader usage report," such as a hardware configuration of the client machine 104, an application ID of a video game that was executed, hashes of the machine code for all of the compiled shaders, a device ID of the client machine 104, and/or the like.

At 804, the remote system 106 may determine that compiled shader code corresponding to one or more of the received shader IDs has already been distributed to one or more client machines 104, such as by implementing the process 400, as described herein, and recording information about the transmitted shader code.

At 806, the remote system 106 may request the compiled shader code from the client machine 104 (i.e., the same client machine 104 that discarded the other shader code and re-compiled the shader(s) corresponding to that discarded shader code in the process 700 of FIG. 7).

At 808, the remote system 106 may receive the compiled shader code 116 it requested from the client machine 104.

At 810, the remote system 106 may compare the received shader code 116 to the already-distributed shader code.

At 812, the remote system 106 may determine, based on the comparison at block 810, whether the compiled shader code 116 received from the client machine 104 at block 808 matches the already-distributed shader code.

If the compared shader code matches, the process 800 may follow the "yes" route from block 812 to block 814 where the remote system 106 continues distributing the compiled shader code 116 upon request. If the compared shader code does not match, the process 800 may follow the "no" route from block 812 to block 816 where the remote system 106 may halt further distribution of the already-distributed shader code, such as by refraining from sending that already-distributed shader code to additional client machines 104.

The deliberate discarding of a portion of shader code that is otherwise thought to be "good" (i.e., not corrupt, does not include malware, etc.), as described in in the combined processes of FIGS. 7 and 8, adds more trust into the system. For example, a bad actor can try to create a set of user accounts on client machines 104 that generate malicious code disguised as shader code (with a shader ID that matches the shader ID of "good" shader code) in order to have it redistributed through the remote system 106. However, because malicious code is different from the actual, "good" shader code, the remote system 106 will eventually receive the "good" shader code from a client machine 104 at block 808, and will catch the discrepancy at block 812 to halt further distribution of the malicious code.

The deliberate discarding of a portion of shader code also guards against accidental corruption of code (e.g., a bit being flipped), which could cause video games to crash, or cause rendering problems during gameplay.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:
1. A client machine comprising:
a central processing unit (CPU);
a graphics processing unit (GPU); and memory storing computer-executable instructions that, when executed by the CPU, cause the client machine to:
  load a client application configured to execute one of multiple installed programs that render graphics on a display associated with the client machine;
  send a request to a remote computing system for compiled shader code for a program of the multiple installed programs, the request including a hardware configuration of the client machine;
  receive an indication from the remote computing system that the compiled shader code is not available;
  execute the program;
  compile, by a graphics driver of the client machine, a set of shaders as compiled shaders in machine code that is executable by the GPU;
  cache, by the graphics driver, the compiled shaders in a predefined memory location and in association with an application identifier (ID) of the program;
  generate a set of shader IDs for the compiled shaders; and
  send information to the remote computing system, the information including:
    the hardware configuration of the client machine,
    the application ID of the program, and
    the set of shader IDs for the compiled shaders.

2. The client machine of claim 1, wherein the program is a video game.

3. The client machine of claim 1, wherein the hardware configuration specifies a version of the graphics driver and a model of the GPU.

4. The client machine of claim 1, wherein the computer-executable instructions, when executed by the CPU, further cause the client machine to hash the machine code for the compiled shader code to generate a set of hashes, and wherein the set of hashes are included in the information sent to the remote computing system.

5. A method, comprising:
  receiving, by a remote computing system, first information from a first client machine, the first information including:
    a first hardware configuration of the first client machine,
    an application identifier (ID) of a program that renders graphics on a display associated with a client machine during execution of the program on the client machine, and
    a set of shader IDs of shaders that were compiled by a graphics driver of the first client machine during execution of the program on the first client machine;
  cataloguing, by the remote computing system, the set of shader IDs according to the first hardware configuration and the application ID;
  requesting, by the remote computing system and from the first client machine, compiled shader code corresponding to one or more shaders of the shaders;
  receiving, by the remote computing system, the compiled shader code from the first client machine;
  associating the compiled shader code with the application ID and the first hardware configuration for redistribution;
  receiving, by the remote computing system, second information from a second client machine, the second information including:
    a second hardware configuration of the second client machine, and
    the application ID of the program;
  determining, by the remote computing system, that the second hardware configuration matches the first hardware configuration; and
  sending, by the remote computing system, the compiled shader code to the second client machine for execution by a graphics processing unit (GPU) of the second client machine during execution of the program on the second client machine.

6. The method of claim 5, wherein the program is a video game.

7. The method of claim 5, wherein the set of shader IDs comprises a set of shader keys, and wherein the set of shader keys are received from the first client machine in a set of tuples, an individual tuple including a shader key and a hash of the compiled shader code for a shader corresponding to the shader key.

8. The method of claim 7, further comprising:
  hashing, by the remote computing system, the compiled shader code received from the first client machine to generate a verification hash of the compiled shader code,
  wherein the associating the compiled shader code with the application ID and the first hardware configuration for redistribution is based at least in part on the verification hash matching the hash of the compiled shader code in a tuple of the set of tuples received from the first client machine.

9. The method of claim 5, wherein the determining that the second hardware configuration matches the first hardware configuration comprises determining that the first hardware configuration and the second hardware configuration specify a common graphics driver version and a common GPU model.

10. The method of claim 5, wherein the requesting of the compiled shader code is performed in response to the remote computing system having received one or more shader IDs of the one or more shaders from at least a predefined number of different client machines, the different client machines including the first client machine and at least one additional client machine.

11. The method of claim 5, further comprising, prior to the associating the compiled shader code with the application ID and the first hardware configuration for redistribution:
  receiving, by the remote computing system, additional shader IDs from a plurality of client machines having different hardware configurations and providing different application IDs;
  cataloguing, by the remote computing system, the additional shader IDs by hardware configuration and application ID;
  counting, by the remote computing system, for a particular shader ID of the one or more shaders, a number of different client machines that sent the particular shader ID to the remote computing system; and
  determining that the number of the different client machines meets or exceeds a threshold number,
  wherein the associating the compiled shader code with the application ID and the first hardware configuration for redistribution is based at least in part on the determining that the number of the different client machines meets or exceeds the threshold number.

12. The method of claim 5, further comprising, prior to the associating the compiled shader code with the application ID and the first hardware configuration for redistribution:
  determining that a user account associated with the first client machine is a trusted account, wherein the associating the compiled shader code with the application ID and the first hardware configuration for redistribution is based at least in part on the determining that the user account is a trusted account.

13. The method of claim 5, further comprising, prior to the associating the compiled shader code with the application ID and the first hardware configuration for redistribution:
receiving, by the remote computing system, additional shader IDs from a plurality of client machines having hardware configurations that match the first hardware configuration;
receiving, by the remote computing system, the compiled shader code from at least one client machine of the plurality of client machines in addition to the receiving of the compiled shader code from the first client machine; and
determining that the compiled shader code received from the at least one client machine matches the compiled shader code received from the first client machine,
wherein the associating the compiled shader code with the application ID and the first hardware configuration for redistribution is based at least in part on the determining that the compiled shader code received from the at least one client machine matches the compiled shader code received from the first client machine.

14. The method of claim 5, further comprising, after the sending of the compiled shader code to the second client machine:
receiving, by the remote computing system, a shader ID of the one or more shader IDs from a third client machine having a third hardware configurations that matches the first hardware configuration, wherein a user account associated with the third client machine is a trusted user account;
receiving, by the remote computing system, the compiled shader code from the third client machine in addition to the receiving of the compiled shader code from the first client machine;
determining that the compiled shader code received from the third client machine does not match the compiled shader code received from the first client machine; and
refraining from sending the compiled shader code to additional client machines based at least in part on the determining that the compiled shader code received from the third client machine does not match the compiled shader code received from the first client machine.

15. A client machine comprising:
a central processing unit (CPU);
a graphics processing unit (GPU); and
memory storing computer-executable instructions that, when executed by the CPU, cause the client machine to:
load a client application configured to execute one of multiple installed programs that render graphics on a display associated with the client machine;
send a request to a remote computing system for compiled shader code for a program of the multiple installed programs, the request including a hardware configuration of the client machine and an application identifier (ID) of the program;
receive the compiled shader code corresponding to the hardware configuration and the application ID of the program;
store at least a portion of the compiled shader code at a predefined memory location; and
execute the program, wherein executing the program includes the GPU executing at least the portion of the compiled shader code retrieved from the predefined memory location in lieu of a graphics driver of the client machine creating the compiled shader code.

16. The client machine of claim 15, wherein the computer-executable instructions, when executed by the CPU, further cause the client machine to discard at least some of the compiled shader code as discarded shader code, wherein the portion of the compiled shader code represents a remainder of the compiled shader code other than the discarded shader code.

17. The client machine of claim 16, wherein the computer-executable instructions, when executed by the CPU, further cause the client machine to:
compile, by the graphics driver, a set of shaders corresponding to the discarded shader code as compiled shaders in machine code that is executable by the GPU;
cache, by the graphics driver, the compiled shaders in the predefined memory location and in association with the application ID of the program;
generate a set of shader IDs for the compiled shaders; and
send information to the remote computing system, the information including:
the hardware configuration of the client machine,
the application ID of the program, and
the set of shader IDs for the compiled shaders.

18. The client machine of claim 17, wherein the set of shader IDs comprises a set of shader keys, and wherein the set of shader keys are sent in a set of tuples, an individual tuple including a shader key and a hash of the machine code for a shader corresponding to the shader key.

19. The client machine of claim 15, wherein the program is a video game.

20. The client machine of claim 15, wherein the hardware configuration specifies a version of the graphics driver and a model of the GPU.

* * * * *